United States Patent [19]
Strickland

[11] Patent Number: 6,101,251
[45] Date of Patent: *Aug. 8, 2000

[54] METHOD AND APPARATUS FOR ROUTING AN ANONYMOUS CALL

[75] Inventor: David Strickland, Plano, Tex.

[73] Assignee: Ericsson Inc, Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/766,974

[22] Filed: Dec. 16, 1996

[51] Int. Cl.⁷ .............................. H04M 3/42; H04M 1/64; H04M 1/57; H04M 7/00

[52] U.S. Cl. ....................... 379/213; 379/88.21; 379/142; 379/196; 379/230

[58] Field of Search ................................ 379/67, 88, 142, 379/127, 201, 214, 210, 211, 212, 213, 197, 196, 207, 88.21, 230

[56] References Cited

U.S. PATENT DOCUMENTS

| | | |
|---|---|---|
| 4,782,508 | 11/1988 | Borchering et al. ................ 379/197 |
| 5,029,196 | 7/1991 | Morganstein ........................ 379/142 |
| 5,033,076 | 7/1991 | Jones et al. ......................... 379/142 |
| 5,161,181 | 11/1992 | Zwick .................................. 379/142 |
| 5,341,414 | 8/1994 | Popke .................................. 379/142 |
| 5,412,711 | 5/1995 | Hayashi ............................... 379/142 |
| 5,497,414 | 3/1996 | Bartholomew ...................... 379/142 |
| 5,521,969 | 5/1996 | Paulus ................................. 379/142 |
| 5,533,106 | 7/1996 | Blumhardt ........................... 379/142 |

*Primary Examiner*—Harry S. Hong
*Attorney, Agent, or Firm*—Jenkens & Gilchrist

[57] ABSTRACT

An apparatus and method are disclosed for playing an announcement to a calling party that is placing a call in an anonymous manner to prompt the calling party to respond in a manner which causes a switch to make the call identifiable by the called party. The apparatus is operable to play the announcement if the called party is a subscriber to anonymous call rejection and has activated the feature and if the calling party is calling in an anonymous mode. If the calling party does not respond within a specified time period the call is blocked. Specified responses include verbal responses as well as key entries on the calling party phone. A typical specified time period is five seconds.

10 Claims, 3 Drawing Sheets

METHOD AND APPARATUS FOR ROUTING AN ANONYMOUS CALL

BACKGROUND OF THE INVENTION

1. Technical Field of the Invention

This invention relates generally to the telecommunications field, and more specifically, to a method and apparatus for responding to anonymous calls within a telecommunications network.

2. Description of Related Art

Traditionally, the home telephone has facilitated communications between friends and family. However, many calls received during the evening are from organizations seeking to sell products or collect donations. Because these calls are unsolicited and usually unwelcome, there is a great demand for subscriber features which enable telephone customers to curtail the ability of outside organizations to invade their privacy at home. Exemplary and commonly known subscriber features which have been developed to help the consumer include Caller ID, Anonymous Call Rejection, Specified Call Blocking and Do Not Disturb. In general, these features either provide information to the called party about an incoming call or operate to reject a call for a specified reason.

A problem with anonymous call rejection is that an anonymous calling party is forced to hang-up and redial the called party phone number in a non-anonymous manner. In other words, the call is routed with specified information which identifies the calling party. Frequently, telephone service subscribers make outgoing calls anonymous by default. This capability is often ordered as a part of the telephone service provided by the phone company. Consequently, all outgoing calls are unidentifiable anonymous calls.

In some situations, however, a calling party is unable to deactivate the anonymous call feature after a call has been blocked. For example, a calling party's employer may require all calls to be made anonymously through default, as described above. Accordingly, a calling party that is an employee will not be authorized to deactivate the anonymous calling feature. In other scenarios, the calling party may not know the anonymous call feature deactivation code. In both of these cases, a call will not be connected to the called party because the calling party was not able to deactivate the anonymous call feature. Even if the calling party is able to de-activate the anonymous calling feature, the calling party must, under current systems, hang up, dial a specified code, and redial the called party phone number in order to place the call. What is needed, therefore, is a way to allow a calling party to deactivate the anonymous calling feature for a current call without being forced to hang-up and redial.

SUMMARY OF THE INVENTION

A method and apparatus are provided for allowing an anonymous call to be completed without forcing the calling party to hang up and redial even though the called party's active subscriber features include anonymous call rejection. An announcement prompts the calling party to selectively de-activate the anonymous call feature to make the call identifiable. The call becomes identifiable if the calling party's caller ID, or phone number, may be transmitted to the called party. The system may only transmit the calling party phone number, however, if the calling party responds in a specified manner to the announcement. Consequently, the anonymous calling party becomes identifiable during the present call and avoids having the call blocked even if the anonymous call blocking feature is presently activated for the called party.

BRIEF DESCRIPTION OF THE DRAWINGS

A better understanding of the method and apparatus of the present invention may be obtained by reference to the following Detailed Description along with the accompanying Drawings wherein.

DETAILED DESCRIPTION OF THE DRAWINGS

Figure 1:
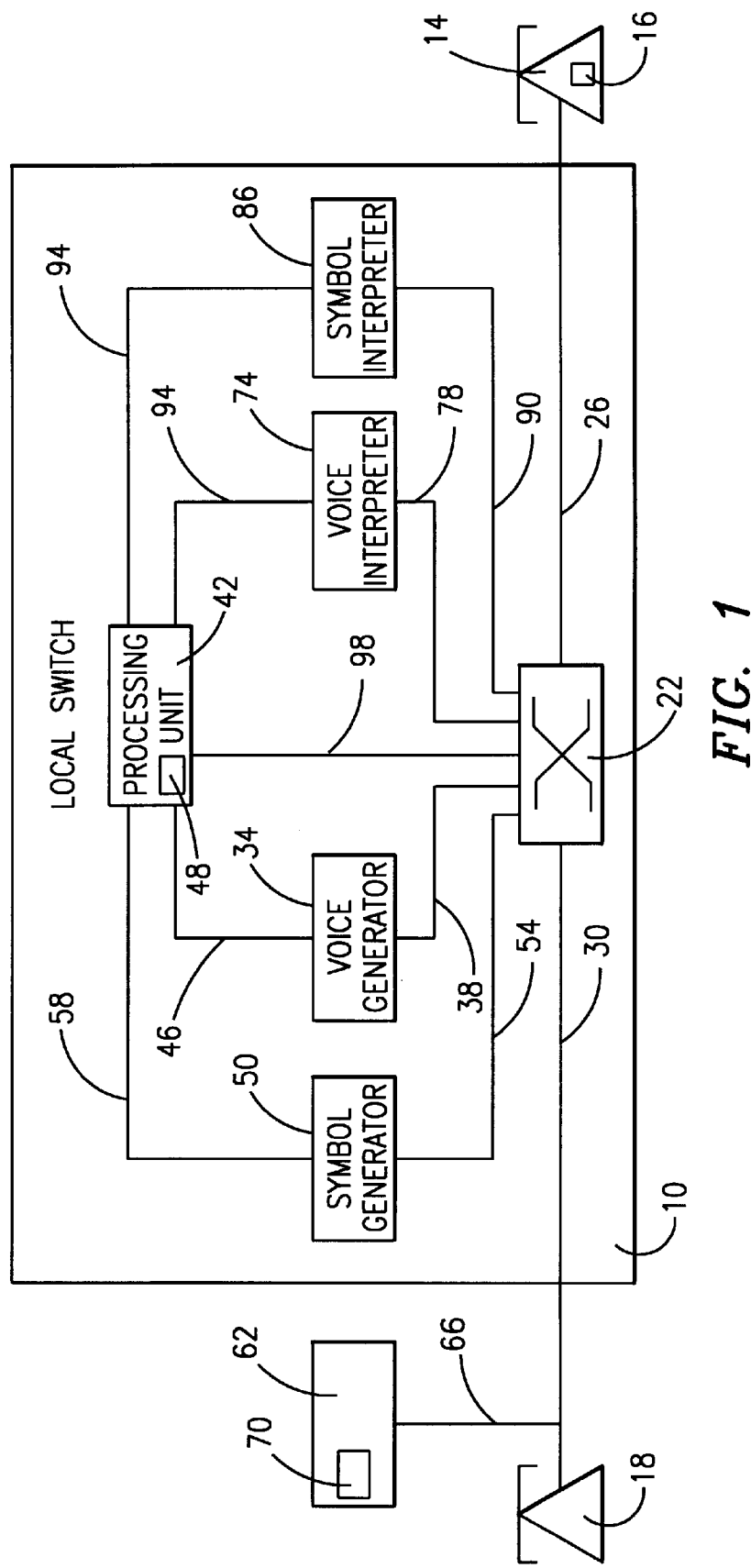
FIG. 1 is a functional block diagram that illustrates one embodiment of the present invention as implemented within a local switch.

FIG. 1 is a functional block diagram that illustrates one embodiment of the present invention. Referring to FIG. 1, a local switch 10 for connecting a calling party phone 14 having a keypad 16 to a called party phone 18 is shown. Local switch 10 includes a router 22 which is connected to calling party phone 14 by line 26 and to called party phone 18 by line 30. Generally, router 22 is for connecting one phone line to another and for connecting feature devices within switch 10 to the phone lines carrying a particular call. Feature devices are those devices which are used by a telecommunication network to support subscriber features such as caller ID, call blocking, etc.

One feature device within local switch 10 is a voice generator 34 for generating messages to be played either to a called party or to a calling party. Voice generator 34 is connected to router 22 by line 38 and to processing unit 42 by line 46. Local switch 10 also includes a symbol generator 50 which is connected to router 22 by line 54 and to processing unit 42 by line 58. Symbol generator 50 is for generating signals which cause specified symbols to be displayed on a display device. For example, symbol generator 50 can generate signals to cause caller ID display 62, which is connected to line 30 by line 66, to display a specified symbol to identify a caller by name or by number. Caller ID display 62 receives signals on line 66 to generate a symbol 70, which symbol 70 identifies the caller.

Local switch 10 further includes a voice interpreter 74. Voice interpreter 74 is connected to router 22 by line 78 and to processing unit 42 by line 82. Voice interpreter 74 is for detecting speech or other sounds produced at a telephone and for interpreting the speech or other sounds.

Local switch 10 further includes a symbol interpreter 86. Symbol interpreter 86 is connected to router 22 by line 90 and to processing unit 42 by line 94. Symbol interpreter 86 is for detecting and for interpreting a dual tone multi-frequency (DTMF) signal produced at a phone, which is produced whenever a key on a keypad of the telephone is depressed.

Local switch 10 also connects calling party phone 14 to called party phone 18 and to caller ID display 62. In the system shown in FIG. 1, called party phone 18 is connected to calling party phone 14 merely by router 22 within local switch 10. It is understood, however, that one or more tandem switches and local switches (not explicitly shown)

may be included for connecting calling party phone 14 to router 22. As may be seen, processing unit 42 is also connected to router 22 by line 98. Processing unit 42 transmits control commands to router 22 over line 98 to control the connections there within router 22.

In operation, local switch 10 determines whether the anonymous call blocking subscriber feature is activated for the called party at called party phone 18 whenever a called party phone 18 is receiving a call. Local switch 10 analyzes the content of store 48 within processing unit 42. Generally, store 48 includes a list of all telephones connected to and serviced by local switch 10 and their corresponding subscriber features. In another embodiment, however, store 48 could just as well maintain a list of those subscribers having the anonymous call blocking subscriber feature. Moreover, store 48 may also be external to processing unit 42 and coupled to provide data thereto. For example, store 48 may include a database coupled to local switch 10.

If the called party is a subscriber of the anonymous call blocking feature, local switch 10 then determines if the anonymous call blocking feature is presently activated for the called party. In the preferred embodiment, the called party anonymous call blocking feature is continuously activated. In another embodiment, however, the feature is selectable by the called party. For this embodiment, local switch 10 examines a specified stored signal to determine if the anonymous call blocking feature is presently activated. This specified stored signal may be stored either within store 48 or within another memory store (not explicitly shown in FIG. 1).

If a call is being received for a called party when the anonymous call rejection feature is activated, local switch 10 prompts the calling party at calling party phone 14 to allow the calling party to be identifiable by the called party. To prompt the calling party, processing unit 42 sends a signal to voice generator 34 over line 46 which causes voice generator 34 to generate a specified announcement. This specified announcement is output on line 38 to router 22. The announcement instructs the calling party to respond either vocally or by keypad entry. Router 22 is operable to connect line 38 to line 26 to cause calling party phone 14 to receive the announcement generated by voice generator 34.

Whether the specified announcement generated by voice generator 34 instructs the calling party to respond by depressing a key or by responding verbally depends on the type of circuitry found within local switch 10. If local switch 10 includes only a voice interpreter 74, then the announcement generated by voice generator 34 instructs the calling party to respond verbally. If local switch 10 includes only a DTMF symbol interpreter 86, then the announcement instructs the calling party to respond by depressing a key on the key pad 16 of calling party phone 14. If local switch 10 includes both a voice interpreter 74 and a symbol interpreter 86, similar to the embodiment illustrated in FIG. 1, then the announcement gives the calling party the option of responding by responding vocally or by depressing a key.

Referring still to FIG. 1, voice interpreter 74 and symbol interpreter 86 are both connected to router 22 by lines 78 and 90, respectively. Router 22 connects lines 78 and 90 to line 26. Accordingly, voice interpreter 74 and symbol interpreter 86 are connected to receive and interpret the calling party response. Both voice interpreter 74 and symbol interpreter 86 are operable to interpret and determine whether the calling party at calling party phone 14 has responded in a manner which indicates that the calling party has granted permission to make the present call identifiable. Voice interpreter 74 and symbol interpreter 86 are also connected by lines 82 and 94, respectively, to processing unit 42 to produce a signal thereto specifying the calling party response. If the calling party does not respond within a specified amount of time, e.g., 5 seconds, the system will block the call. While the specified amount of time may be varied, it is generally preferable to minimize the delay for the calling party. Accordingly, a typical specified amount of time might be, for example, fifteen seconds or less.

Upon receiving a signal reflecting the calling party response or lack thereof, processing unit 42 transmits a signal on line 58 to symbol generator 50 specifying whether caller ID display 62 may display calling party information. In the system of FIG. 1, symbol generator 50 responds by producing display signals on line 54. These display signals produced by symbol generator 50 include the calling party information as well as the signal which specifies whether caller ID display 62 may display calling party information. In another embodiment, however, symbol generator 50 only transmits display signals which identify the caller if the caller has given his or her permission. Accordingly, if the calling party responds by giving his permission to make the call identifiable, processing unit 42 transmits control commands on line 98 to router 22. The control commands cause router 22 to connect line 26 to line 30 and complete the call.

Referring again to FIG. 1, router 22 connects line 54 from symbol generator 50 to line 30 which is connected to called party phone 18 and to caller ID display 62. Accordingly, when router 22 receives a signal from symbol generator 50 on line 54, that signal is transmitted on line 30 to caller ID display 62 and to called party phone 18. Caller ID display 62, which is connected to called party line 30 by line 66, receives the signal generated by symbol generator 50 and produces the corresponding symbol 70 for viewing by the called party. Symbol 70 can be in the form of numerals, letters, and other symbols which provide pertinent information about the calling party.

Local switch 10 instructs a calling party to identify the type of call either vocally or by keypad entry. This is because local switch 10 includes both a voice interpreter 74 and a symbol interpreter 86 to interpret the response by the calling party at calling party phone 14. Local switch 10 also includes a symbol generator 50 for producing specialized symbols to identify or provide information about the calling party.

The embodiment illustrated in FIG. 1 may be modified to include only voice interpreter 74 or symbol interpreter 86. Furthermore, the system shown in FIG. 1 may be adapted for use with SS7 networks, public land mobile networks, and other types of communication networks.

Figure 2:
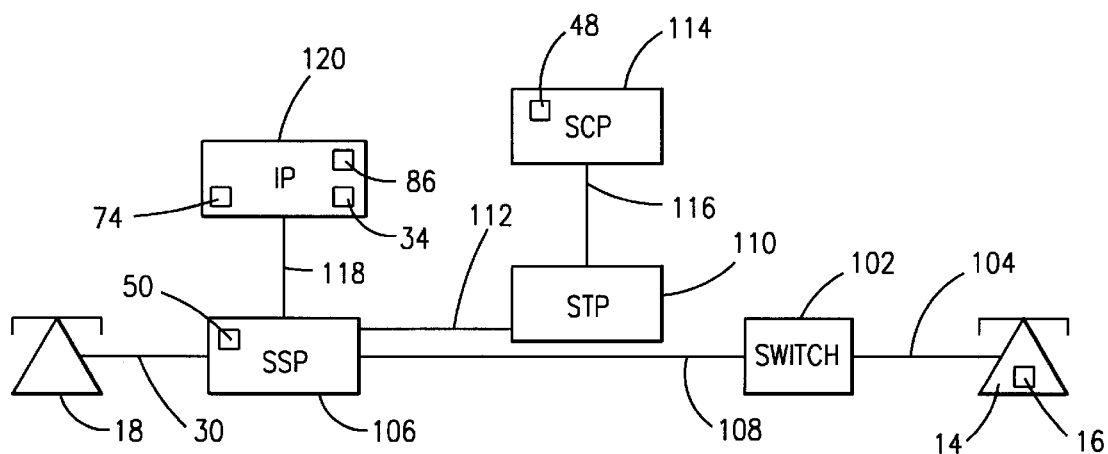
FIG. 2 is a functional block diagram that illustrates a second embodiment of the present invention as implemented within an advanced intelligent network.

FIG. 2 is a functional block diagram that illustrates a second embodiment wherein the present invention is implemented within an advanced intelligent network ("AIN"). Referring now to FIG. 2, the system of FIG. 2 is similar to the system of FIG. 1, and includes a symbol generator 50, a voice generator 34, a voice interpreter 74, a symbol interpreter 86 and a store 48. However, the AIN also includes a service switching point ("SSP") 106, a signal transfer point ("STP") 110, a service control point ("SCP") 114 and an intelligent peripheral ("IP") 120. The SSP 106, STP 110, SCP 114 and IP 120 are connected in a known AIN configuration. More specifically, as may be seen, calling party phone 14 is connected to switch 102 by line 104. Switch 102 is connected to SSP 106 by line 108. SSP 106 is connected to STP 110 by line 112. STP 110 also is connected to SCP 114 by line 116. IP 120 is connected to SSP 106 by line 118. It is understood that any one of a voice generator 34, a voice interpreter 74, a symbol interpreter 86, store 48 and symbol generator 50 may be implemented as a part of standard AIN circuitry as described above or as separate circuitry coupled thereto.

The functionality of the commonly numbered elements within FIGS. 1 and 2 is the same for the embodiments shown in FIGS. 1 and 2. For example, voice generator 34 of FIG. 1 is shown as a system within local switch 10. In the embodiment shown in FIG. 2, however, voice generator 34 preferably resides within IP 120. Nonetheless, the functionality for voice generator 34 is similar for each of the two embodiments. For each embodiment, voice generator 34 is operable to play announcements to calling party at calling party 14.

Operationally, SSP 106 analyzes the called party information for a call being placed by calling party phone 14, and determines whether an AIN treatment is needed and whether the subscriber has AIN capabilities. SSP 106 then sends an inquiry message to STP 110 over line 112. STP 110 then transmits the inquiry message to SCP 114 over line 116. SCP 114 then analyzes the contents of store 48 to determine that called party phone 18 is a subscriber of the anonymous call rejection subscriber feature. If that feature is activated for called party phone 18, SCP 114 sends a response message to SSP 106 via STP 110. SSP 106 then prompts IP 120 to cause voice generator 34 to play a specified announcement. The message generated by voice generator 34 is routed to calling party phone 14. Similar to the system of FIG. 1, SSP 106 delays the routing process of the call for a specified amount of time after completion of the announcement to give the calling party ample time to respond properly (e.g., depress a key or respond verbally to indicate that the call may be made identifiable)

Figure 3:
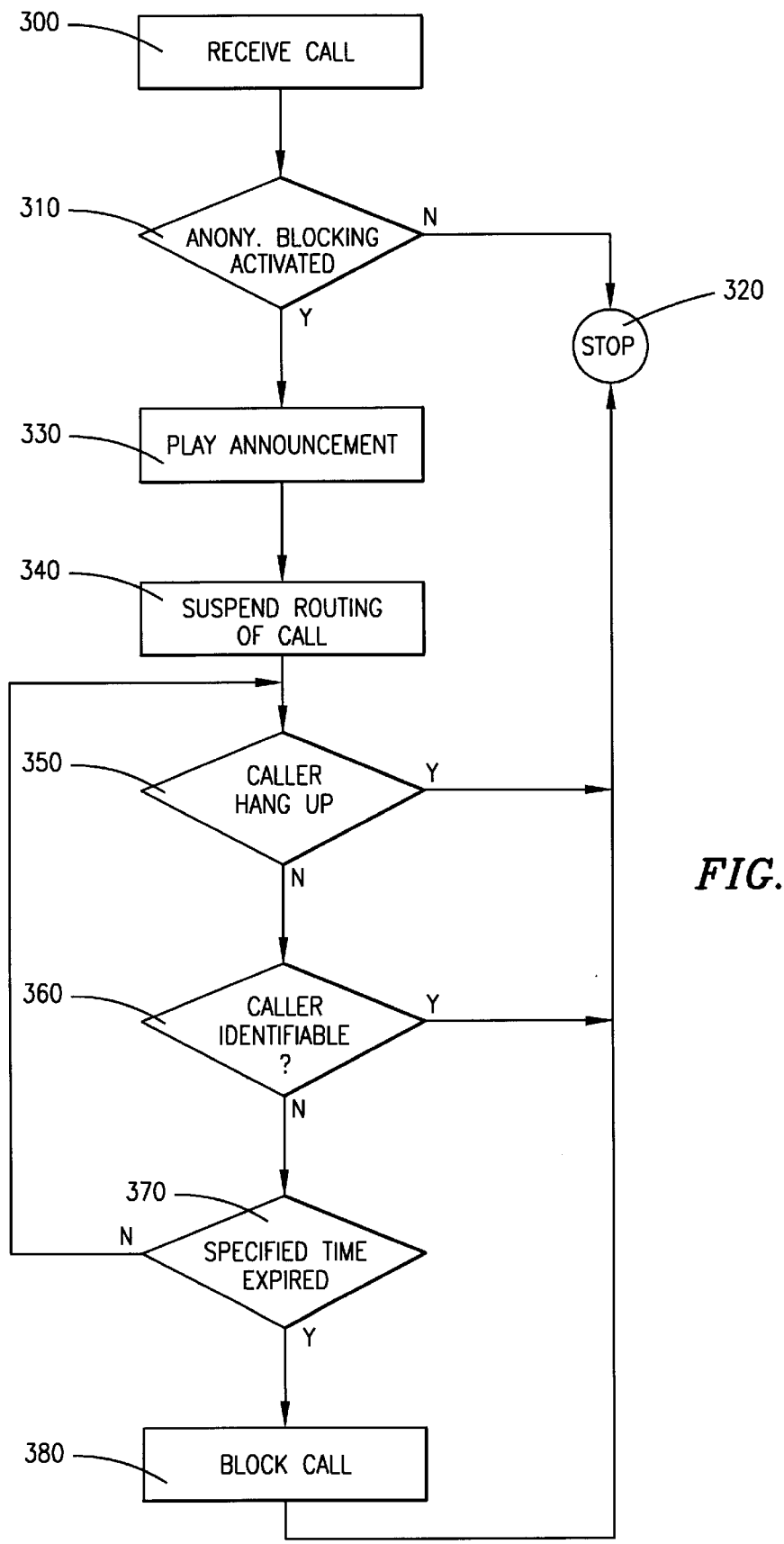
FIG. 3 is a flow chart that illustrates a method for allowing an anonymous caller to become identifiable, in accordance with a preferred embodiment of the present invention.

FIG. 3 is a flow chart that illustrates a method for allowing an anonymous caller to become identifiable, in accordance with a preferred embodiment of the present invention. Referring now to FIG. 3, the method of the present invention begins upon the receipt of a call within a telecommunication switch (step 300) After a call is received, the switch determines whether the anonymous call blocking subscriber feature is presently activated for the called party (step 310). If not, the present method is terminated (step 320). If the anonymous call blocking subscriber feature is activated for the called party, a specified announcement is played to the calling party by the switch or other device withing the telecommunication network (step 330) and the routing of the call is temporarily suspended (step 340). It is worth noting that the announcement may be played by a voice generator within a switch or by an equivalent device. For example, circuitry within an intelligent peripheral within an advanced intelligent network may generate the announcement. It is also worth noting that the call is not blocked, but is only suspended for a specified amount of time, at this point.

While the call routing is suspended, the switch periodically monitors the calling party line to determine whether the calling party has hung up or released the line (step 350). The switch also monitors the calling party line to determine if the calling party has responded in a specified manner to make the call identifiable (step 360). While periodically performing steps 350 and 360, the switch monitors the amount of time that has expired since the call routing was suspended to determine whether a specified amount of time has expired (step 370). If a specified amount of time has not expired, the switch continues to perform steps 350 and 360. A typical specified amount of time is five (5) seconds. Once the specified amount of time has expired, the call is blocked (step 380) and the inventive method is complete.

Although an embodiment of the method and apparatus of the present invention has been illustrated in the accompanying Drawings and described in the foregoing Detailed Description, it is understood that the invention is not limited to the embodiments disclosed, but can be arranged in numerous ways and that modifications and substitutions may be made without departing from the spirit of the invention as set forth and defined by the following claims.

What is claimed is:

1. In an advanced intelligent network having at least one Service Switching Point in communication with a Service Control Point, a method for selectively routing a communication request from a calling party to a called party, said method comprising the following steps:

analyzing, at a given Service Switching Point associated with said called party, whether said communication request to said called party is advance intelligent network (AIN) capable;

transmitting said communication request, if AIN capable, to said Service Control Point;

determining, by reference to a memory within said Service Control Point, if said called party has an active anonymous call rejection subscriber feature associated therewith;

prompting, by said Service Control Point, an Intelligent Peripheral to generate an announcement to said calling party;

transmitting, from a voice generator attached to said Intelligent Peripheral, if said anonymous call rejection subscriber feature is active and if said communication request from said called party has an anonymous call feature associated therewith, said announcement to said calling party, said announcement being routed to said calling party and requesting removal of said anonymous call feature associated with said calling party communication request;

suspending routing of said communication request from said calling party to said called party for a given time period, whereby said calling party may remove said anonymous call feature associated with said communication request; and upon receipt, at a monitor within said Service Switching Point, of an anonymous call feature removal signal from said calling party, routing said communication request and an identity for said calling party to said called party, and blocking said communication request from said calling party to said called party if said monitor fails to receive said anonymous call feature removal signal during said given time period.

2. The method according to claim 1, whereby said calling party may remove said anonymous call feature by performing a verbal response.

3. The method according to claim 1, whereby said calling party may remove said anonymous call feature by performing a DTMF response.

4. The method according to claim 1, wherein said communication request is suspended for up to a given time period, said communication request being blocked it said calling party fails to deactivate said anonymous call feature associated therewith within said given time period.

5. The method according to claim 4, wherein said calling party may respond verbally.

6. The method according to claim 4, wherein said calling party may respond using DTMF.

7. The method according to claim 4, wherein said given time period is less than 15 seconds.

8. The method according to claim 7, wherein said given time period is less than 5 seconds.

9. The method according to claim 1, wherein said given time period is less than 15 seconds.

10. The method according to claim 9, wherein said given time period is less than 5 seconds.

\* \* \* \* \*

UNITED STATES PATENT AND TRADEMARK OFFICE
CERTIFICATE OF CORRECTION

PATENT NO. : 6,101,251
DATED : August 8, 2000
INVENTOR(S) : Strickland

It is certified that error appears in the above-identified patent and that said Letters Patent is hereby corrected as shown below:

Column 5,
Line 33, after "(step 300)" insert -- . --

Column 6,
Line 52, replace "blocked it" with -- blocked if --

Signed and Sealed this

Fifteenth Day of April, 2003

JAMES E. ROGAN
*Director of the United States Patent and Trademark Office*